(12) United States Patent
Jun

(10) Patent No.: US 8,604,918 B2
(45) Date of Patent: Dec. 10, 2013

(54) SYSTEM AND METHOD FOR DETECTING A VEHICLE IN THE VICINITY BY USING WIRELESS COMMUNICATION

(75) Inventor: Chan Seok Jun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 13/172,237

(22) Filed: Jun. 29, 2011

(65) Prior Publication Data

US 2012/0112895 A1    May 10, 2012

(30) Foreign Application Priority Data

Nov. 10, 2010 (KR) .......................... 10-2010-0111736
Nov. 10, 2010 (KR) .......................... 10-2010-0111738

(51) Int. Cl.
*B60Q 1/00* (2006.01)
(52) U.S. Cl.
USPC .......................... 340/435; 340/436; 340/425.5
(58) Field of Classification Search
USPC ...................................... 340/435, 436, 425.5
See application file for complete search history.

(56) References Cited

U.S. PATENT DOCUMENTS

| | | | |
|---|---|---|---|
| 5,302,956 A | 4/1994 | Asbury et al. | |
| 7,330,103 B2 * | 2/2008 | Boss et al. | 340/435 |
| 7,382,274 B1 | 6/2008 | Kermani et al. | |
| 7,525,447 B2 * | 4/2009 | Galindo | 340/933 |
| 2006/0155469 A1 | 7/2006 | Kawasaki | |
| 2006/0176191 A1 * | 8/2006 | Galindo | 340/902 |
| 2007/0018800 A1 * | 1/2007 | Boss et al. | 340/435 |
| 2008/0036579 A1 * | 2/2008 | Boss et al. | 340/435 |

FOREIGN PATENT DOCUMENTS

| | | |
|---|---|---|
| JP | 2006025028 A | 1/2006 |
| JP | 2009-003822 A | 1/2009 |
| JP | 2009139998 A | 6/2009 |
| JP | 2009-157466 A | 7/2009 |
| JP | 2009199267 A | 9/2009 |
| JP | 2010-182207 A | 8/2010 |
| KR | 10-2000-0074067 | 12/2000 |
| KR | 10-0519206 | 10/2005 |
| KR | 10-2007-0042800 | 4/2007 |
| KR | 10-2009-0063002 | 6/2009 |

\* cited by examiner

*Primary Examiner* — Travis Hunnings
(74) *Attorney, Agent, or Firm* — Edwards Wildman Palmer LLP; Peter F. Corless

(57) ABSTRACT

The present invention provides a system and a method for detecting whether one more vehicles are in the vicinity of a first vehicle using wireless communication. More specifically, a plurality of transmitters generate a wireless signal and plurality of receivers receive the wireless signal generated in a nearby vehicle. A first unit calculates a distance to the nearby vehicle according to a strength of the received wireless signal. A second estimation unit estimates a location of the nearby vehicle by using a distance between the plurality of the wireless signal receiving units and the calculated distance to the nearby vehicle. A third unit estimates a driving speed of the nearby vehicle based on a travel distance per a unit time of the nearby vehicle by using the location of the nearby vehicle. Subsequently, a fourth unit estimates a driving direction of the nearby vehicle by using the location of the nearby vehicle.

20 Claims, 10 Drawing Sheets

SYSTEM AND METHOD FOR DETECTING A VEHICLE IN THE VICINITY BY USING WIRELESS COMMUNICATION

CROSS-REFERENCES TO RELATED APPLICATIONS

Priority to Korean Patent Application Numbers 10-2010-0111738, 10-2010-0111736 filed on Nov. 10, 2010 which are incorporated herein by reference in their entirety, is claimed.

BACKGROUND OF THE INVENTION

1. Field of the Invention

The present invention relates to a system and a method of detecting a vehicle in the vicinity, and more particularly, to a technique for detecting a vehicle in a blind spot or in a location behind an obstacle via a received signal strength indication (RSSI) in order to estimate a driving direction of the detected vehicle.

2. Description of the Related Art

Generally, a vehicle is equipped with an interior rear view mirror and left and right side view mirrors to enable a driver to have a frontward, rearward or sideward field of view. However, such mirrors cannot provide a full field of view, and thus blind spots often occurs on the left and right sides of the vehicle. In these blind spots an object is not visible to the driver in the left and right side view mirrors.

In order to improve visibility in blind spots, a supplemental mirror can be used depending on a driver's preference. However, the supplemental mirror distracts may distract the driver because they need to view the supplemental mirror separately and therefore must take their eyes off of the road for a longer period of time.

Meanwhile, with the advancement of image processing techniques, those skilled in the art have been able to provide a wider field of view to the driver by installing an object detection means (e.g., a camera) on the front and rear sides of the vehicle in order to display a photographed image of the object to the driver.

However, this method is mainly used to provide frontward and rearward scenes to aid the driver in parking such as a forward moving event or a rear backup event and is not able to provide any further driver assistance when the vehicle is being driven. Particularly, the method is not able to provide for decreased visibility in blind spots on the left and right sides of the vehicle.

In addition, when the vehicle is traveling, the driver needs to be able to identify a location or a distance to other vehicles in the vicinity and, when changing lanes, the driver needs to check whether there are any other vehicles within the adjacent lanes. If the driver changes lanes without accurately identifying the location or the distance to the other vehicles in the vicinity, an accident can occur.

SUMMARY OF THE INVENTION

The present invention provides a system and method for detecting whether one more vehicles are in the vicinity of a first vehicle, For example, these one or more vehicles may be within a blind spot or located behind an obstacle. More specifically, the detected one or more vehicles are detected via a wireless communication technique. Accordingly, the present invention anticipates a collision with one or more vehicles in the vicinity and thereby prevents unnecessary damage, injury or death.

According to one aspect of the present invention, a system for detecting whether one or more vehicles are within an area surrounding a first vehicle is conducted via wireless communication. In particular, the system includes a plurality of wireless signal transmitting units (e.g., transmitters) configured to generate a wireless signal and a plurality of wireless signal receiving units (e.g., receivers) configured to receive the wireless signal generated in a nearby vehicle. Furthermore, the system also includes a first unit (or a nearby vehicle distance calculation unit) that is configured to calculate the distance to a nearby vehicle according to the strength of the received wireless signal. The system also includes second unit (or a nearby vehicle location estimation unit) that is configured to estimate a location of the nearby vehicle based upon a calculated distance between the plurality of the wireless signal receiving units and the calculated distance to the nearby vehicle. In order to estimate the driving speed of the nearby vehicle, a third unit (or a nearby vehicle driving speed estimation unit) is provided in the system. The nearby vehicles speed is calculated based on the travel distance per a particular unit time of the nearby vehicle in relation to the location of the nearby vehicle. As to the direction of travel of a nearby vehicle, a fourth unit (or a nearby vehicle driving direction estimation unit) may be configured to estimate the driving direction of the nearby vehicle based upon the location of the nearby vehicle.

More specifically, the nearby vehicle location estimation unit (or the first unit) determines a point where lines are drawn from two the wireless signal receiving units respectively and the lines meet as a location of the wireless signal transmitting unit of the nearby vehicle by using the distance between the plurality of the wireless signal receiving units and the calculated distance to the nearby vehicle.

The nearby vehicle location estimation unit is then configured to connect the respective wireless signal transmitting units together to form a triangle and determine an initial originator of the wireless signal based on the shape of the triangle which is formed.

The nearby vehicle driving direction estimation unit is configured to estimate the driving direction of the nearby vehicle based on a location of one of the plurality of the wireless signal transmitting units installed on the nearby vehicle. The nearby vehicle driving speed estimation unit is configured to estimate the driving speed of the nearby vehicle based on the travel distance per the unit time of the nearby vehicle in relation to the location of the nearby vehicle.

In accordance with another aspect of the present invention, the above system further comprises a display unit that may display the first vehicle and the nearby vehicle (and optionally its driving direction) on a screen.

Even more specifically, the plurality of the wireless signal transmitting units are configured to form a right angled triangle by connecting therebetween. That is, the plurality of wireless signal receiving units and the plurality of the wireless signal transmitting units are configured to form a triangle by connecting the plurality of the wireless signal receiving units and the plurality of the wireless signal transmitting units via a wireless connection.

In accordance with yet another aspect of the present invention, the system may further include sixth unit (or a collision risk level calculation unit) that is configured to calculate a collision risk level of the nearby vehicle by using the location of the nearby vehicle, the driving direction of the nearby vehicle, and the calculated driving speed of the nearby vehicle.

The collision risk level calculation unit in this embodiment of the present invention may be configured calculate the collision risk level of the nearby vehicle via a first proximity probability and a first shortest stopping distance of a first nearby vehicle having a primary collision risk and calculate a relative collision risk level of a second nearby vehicle having a secondary collision risk with respect to the first nearby vehicle having the primary collision risk by using a second proximity probability and a second shortest stopping distance of the second nearby vehicle.

According to an even further aspect of the present invention, a method of detecting whether one or more vehicles are within an area surrounding a first vehicle is conducted via wireless communication. In particular the method initiates by calculating, by a first unit, a distance to an originating (or initial) point of a wireless signal according to the strength of the wireless signal when the wireless signal is received from a nearby vehicle. Next, a second unit estimates a location of the nearby vehicle by calculating a location of the originating/initiating point of the signal based on a distance to the originating point and a distance between wireless signal receiving units. A third unit then estimates a driving speed and a driving direction of the nearby vehicle based on estimated location of the nearby vehicle.

Furthermore, when the originating point includes multiple originating points, estimation of a location of the nearby vehicle may further include connecting the multiple originating points together to form a triangle and determining a actual originating/initiating point of the multiple originating points based on the shape of the triangle which is formed to estimate a location of the actual originating point with respect to first vehicle. More specifically, the driving direction of the nearby vehicle is estimated based on a location of one of the multiple originating points of the wireless signal and the driving speed of the nearby vehicle is estimated based on a travel distance per a unit time of the nearby vehicle in relation to the location of the nearby vehicle.

In accordance with another aspect of the present invention, the above method may additionally calculate a proximity probability and a shortest stopping distance of a first nearby vehicle having a primary collision risk by using the location of the first nearby vehicle, the driving direction of the first nearby vehicle, and the driving speed of the first nearby vehicle.

In accordance with another aspect of the present invention, the above method may even further calculate a second proximity probability and a second shortest stopping distance of a second nearby vehicle having a secondary collision risk in a case where a brake or steering is applied to avoid the primary collision risk.

In accordance with another aspect of the present invention, the above method may further calculate a collision risk level by using the first proximity probability and the first shortest stopping distance of the first nearby vehicle having the primary collision risk; and also calculate a relative collision risk level of the second nearby vehicle having a secondary collision risk with respect to the first nearby vehicle having the primary collision risk by using the second proximity probability and the second shortest stopping distance of the second nearby vehicle.

Additionally, the method may yet even further display the calculated collision risk level, the driving direction and the driving speed of each nearby vehicle on a screen to a driver/user. Notably, the collision risk level, the driving direction, and the driving speed of the nearby vehicle may be represented as a length, a color or a width of an arrow to be displayed accordingly.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

Hereinafter, a system and a method of detecting whether one more vehicles are in the vicinity of a first vehicle via a wireless communication is described with reference to FIGS. 1 through 11.

Figure 1:
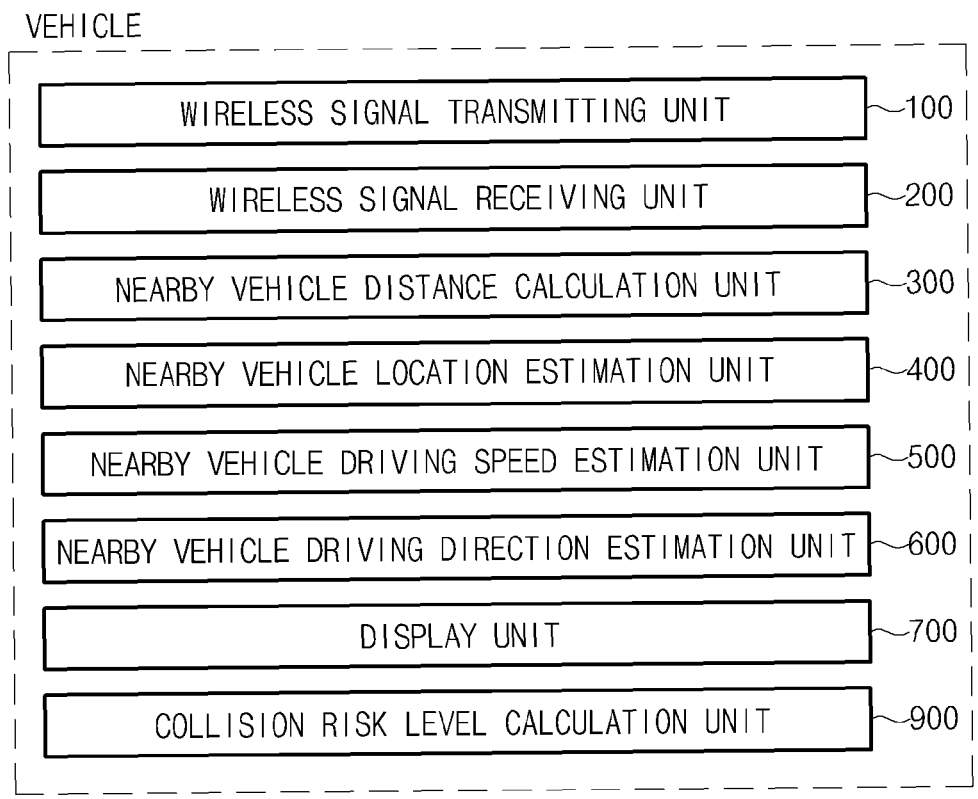
FIG. 1 is a view illustrating a configuration of a system for detecting whether one or more vehicles are within an area surrounding a first vehicle is conducted via wireless communication according to an exemplary embodiment of the present invention.

FIG. 1 is a view illustrating a configuration of a system for detecting one or more nearby vehicles using wireless communication according to an exemplary embodiment of the present invention.

The system for detecting one or more nearby vehicles using wireless communication according to an exemplary embodiment of the present invention includes a wireless signal transmitting unit (e.g., a transmitter) 100, a wireless signal receiving unit (e.g., a receiver) 200, a nearby vehicle distance calculation unit 300, a nearby vehicle location estimation unit 400, a nearby vehicle driving speed estimation unit 500, a nearby vehicle driving direction estimation unit 600, a display unit 700 and a collision risk level calculation unit 900.

Figure 2:
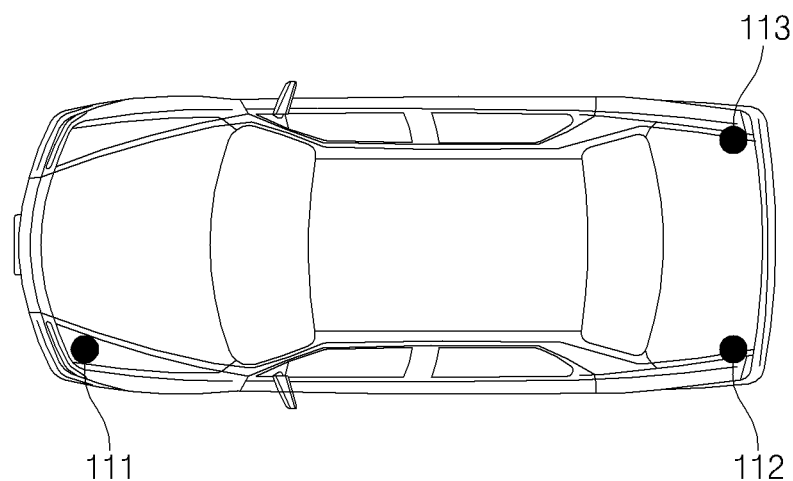
FIG. 2 is a view illustrating an example installment of a wireless signal transmitting unit of FIG. 1.

More particularly, the wireless signal transmitting unit 100 is configured to transmit a wireless signal. Here, as shown in FIG. 2, the wireless signal transmitting unit 100 is installed, for example, on an upper portion of a left front wheel 111 and upper portions of left and right rear wheels 112 and 113, respectively, such that a right angled triangle can be formed by connecting the wireless signal transmitting units 111-113. However, it should be noted that the installation location of the wireless signal transmitting unit 111-113, shown in FIG. 2, is exemplary only and should not be considered as limiting the scope of present invention.

Figure 3:
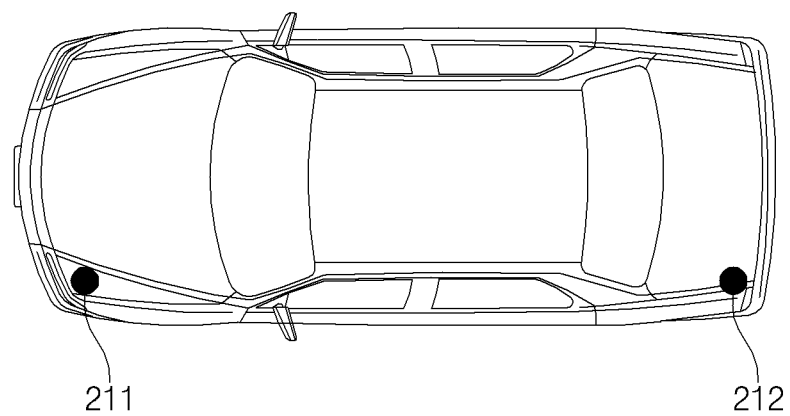
FIG. 3 is a view illustrating an example installment of a wireless signal receiving unit of FIG. 1.

The wireless signal receiving unit 200 receives the wireless signal transmitted from a nearby vehicle. Here, as shown in FIG. 3, the wireless signal receiving unit 200 is, for example, installed on an upper portion of a left front wheel 211 and an upper portion of a left rear wheel 212. Again, however, the installation location of the wireless signal receiving unit 200 may vary. Operationally, signals transmitted and received to/from the wireless signal transmitting unit 100 and the wireless signal receiving unit 200 may have a pre-defined protocol.

The nearby vehicle distance calculation unit 300 measures a strength of the wireless signal received by the wireless signal receiving unit 200 from the nearby vehicle to calculate a distance to the nearby vehicle based on the strength of the received wireless signal. Here, a distance between the wireless signal receiving units 211 and 212 is a fixed value because, e.g., the length of the vehicle in which the receiving units are installed is known. Accordingly, the nearby vehicle distance calculation unit 300 may calculate a distance between an originator of the wireless signal and wireless signal receiving units 211 and 212, respectively.

Here, a received signal strength indication (RSSI), (a technique to express a signal as a one byte value between 0 to 255 depending on a signal strength) can be used to determine a distance to the originator based on a signal value in accordance with the signal strength. The nearby vehicle location estimation unit 400 estimates a location of each originator by using a relative distance of the each originator calculated by the nearby vehicle distance calculation unit 300. Here, referring to FIG. 5, the nearby vehicle location estimation unit 400 forms a triangle based on lengths of three sides, and thus can estimate locations of originators C and D positioned on right and left sides with respect to a subject vehicle by using a distance between wireless signal receiving units A and B of the subject vehicle and distances (e.g., 3 m, 4 m) between the originator and the respective wireless signal receiving units 211 and 212, calculated by the nearby vehicle distance calculation unit 300. Here, the locations of the respective originators may be represented as coordinates relative to the first/subject vehicle.

Figure 6:
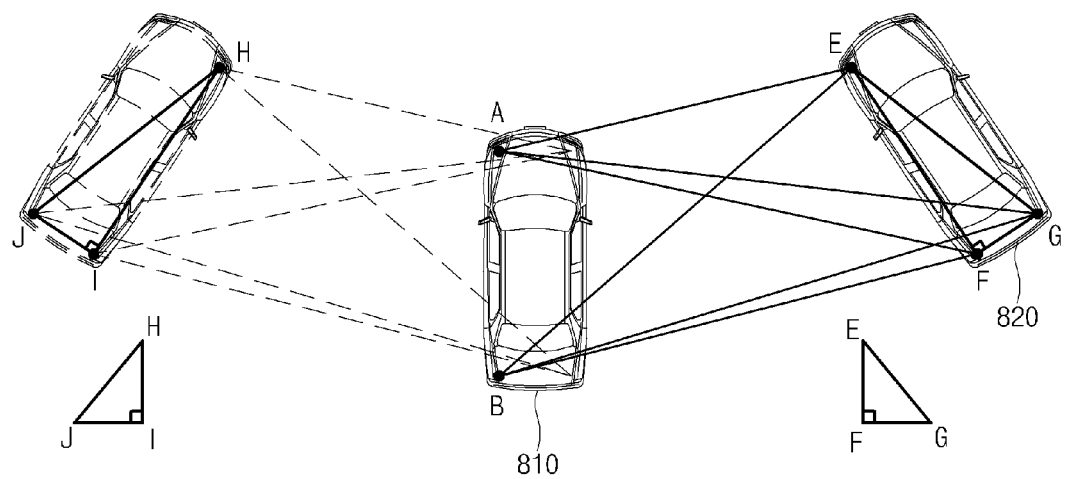
FIG. 6 is a view for explaining a method of estimating a location and a driving direction of a nearby vehicle in FIG. 4.
Figure 7:
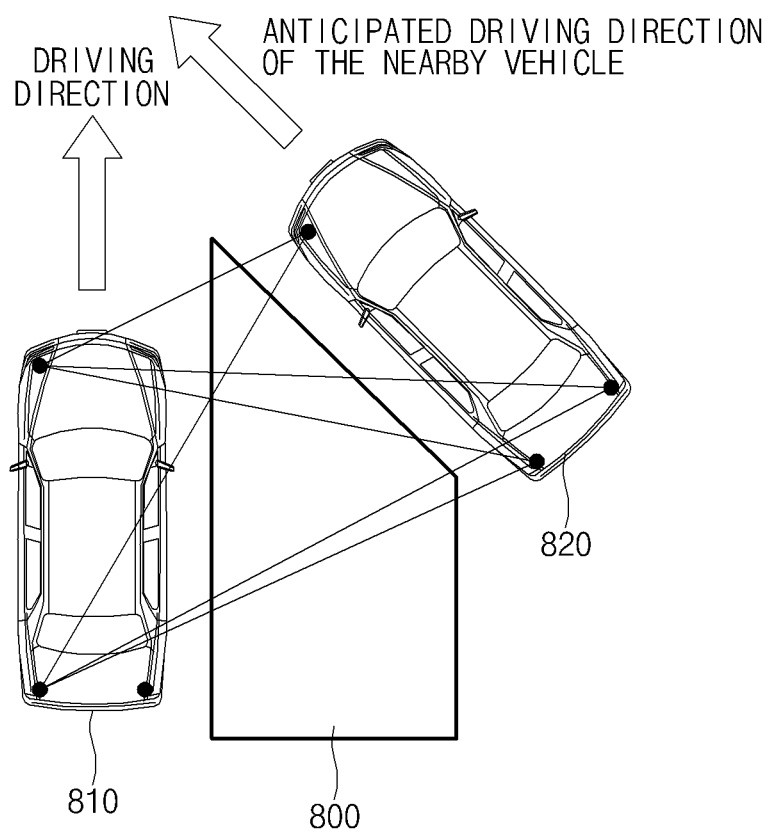
FIG. 7 is a view for explaining an example of detecting a nearby vehicle in a blind spot created by an obstacle.

In more detail, according to a location estimation method with reference to FIG. 6, the nearby vehicle location estimation unit 400 estimates respective exemplary originators E, F, G, H, and I located on right and left sides of the vehicle with respect to a line connecting the wireless signal receiving units A and B of the subject vehicle. Specifically, based on a right angled triangle formed by three points, e.g., E, F and G, that are located on a right side of the subject vehicle and a right angled triangle formed by three points, e.g., H, 7 and I that are located on a left side of the subject vehicle, a decision is made as to which originator/initiator is a real/actual originator according to which triangle has a vertex at a right angle positioned on a left hand side of the triangle.

In FIG. 6, the wireless signal transmitting units 111-113 are installed, for example, on the upper portion of the left front wheel and the upper portions of both of the left and right rear wheels. Depending on the location of the wireless signal transmitting units 111-113, a shape of the right angled triangle can vary, and therefore, the system may modify a method of determining the real originator accordingly.

The nearby vehicle driving speed estimation unit 500 estimates a driving speed based on a travel distance and a travel time of the nearby vehicle measured during a predetermined period of time using a location estimated by the vehicle location estimation unit 400.

The nearby vehicle driving direction estimation unit 600 determines a driving direction of the nearby vehicle by using a right angled triangle formed based on the locations of the originators/initiators estimated by the vehicle location estimation unit 400, as already described above. In FIG. 6, a direction from a base vertex, e.g., F, to a top vertex, e.g., E, is determined as the driving direction in which the vehicle is driven, the base vertex (F) and the top vertex (E) being positioned on a left hand side of the right angled triangle.

Figure 10:
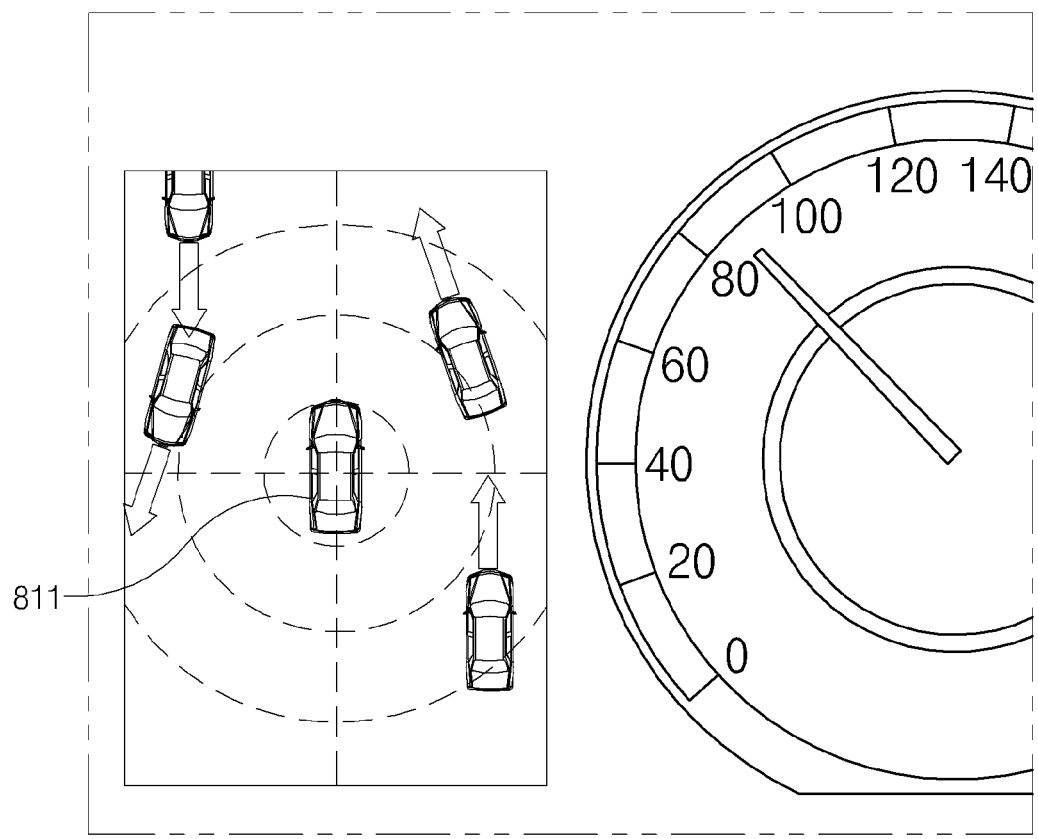
FIG. 10 is a view illustrating an example screen that displays an anticipated collision with a nearby vehicle via a wireless communication according to an exemplary embodiment of the present invention.
Figure 11:
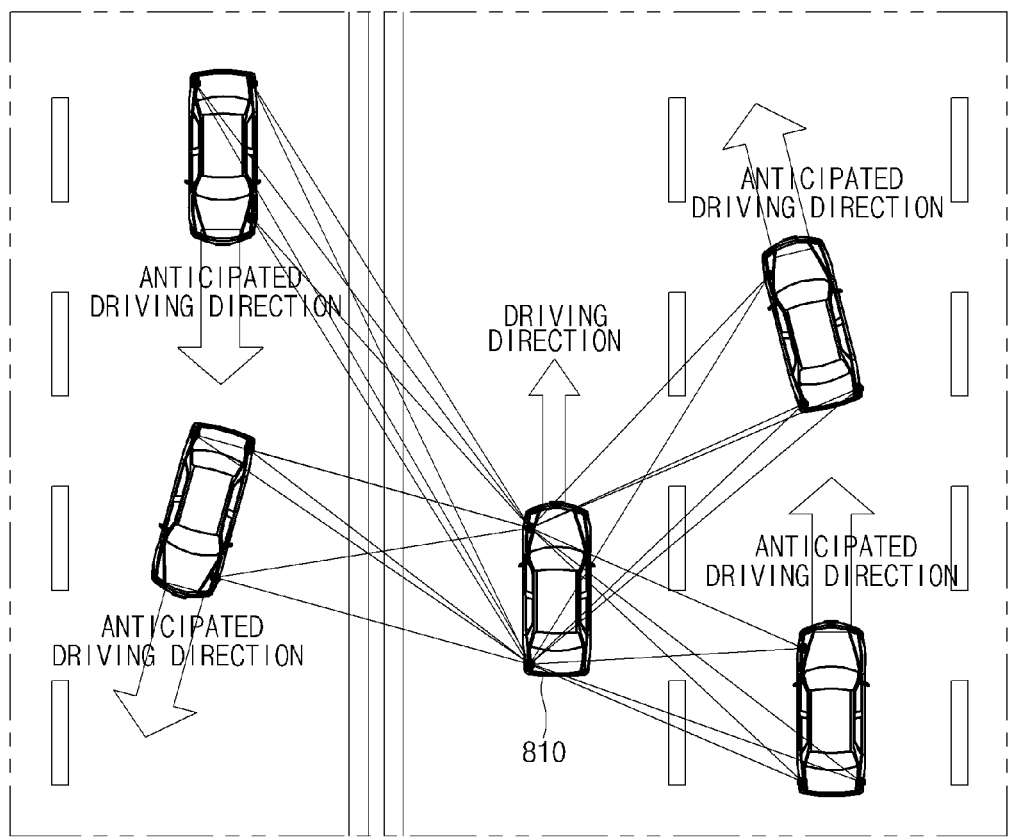
FIG. 11 is a view for explaining a method of displaying a driving direction of a nearby vehicle according to an exemplary embodiment of the present invention.

As shown in FIGS. 10 and 11, the display unit 700 may display the subject vehicle and the nearby vehicle within a corresponding traffic lane. Also, the driving direction and a danger level of the nearby vehicle may be displayed to be viewable by the driver.

The collision risk level calculation unit 900 calculates a collision risk level of the nearby vehicle such as a proximity probability or a shortest stopping distance by using the location, the driving speed and the driving direction of the nearby vehicle, and determines a relative danger level of each nearby vehicle respectively.

Hereinafter, referring to FIG. 4, a method of detecting one or more nearby vehicles using wireless communication according to an exemplary embodiment of the present invention is described.

First, the nearby vehicle distance calculation unit 300 determines whether the wireless signal is received when the vehicle is traveling (S101), and when the wireless signal is received, a signal strength of respective received wireless signals is measured by the nearby vehicle distance calculation unit 300 to calculate a relative distance to an originator of the wireless signal (S102).

Accordingly, the nearby vehicle location estimation unit 400 then calculates the location of the originator/initiator, as shown in FIG. 6, by using the locations of the wireless signal receiving units 211 and 212 and the calculated distance (S103), and forms right angled triangles, e.g., EFG and HJI by connecting multiple originators/initiators (S104). An actual originator/initiator is subsequently determined based on an internal angle of the right angled triangles (e.g., EFG and HJI) that are symmetric to each other. Namely, the actual originator/initiator is determined according to a position of the right angle of the triangle, in this example, EFG and HJI (S105). Here, when it is assumed that the wireless signal transmitting units 111-113 are located on the upper portion of the left front wheel and the upper portions of both of the left and right rear wheels, the right angle of the triangle is at the left rear wheel. Therefore, it the triangle HJI in which the right angle is at the right rear wheel is determined as a virtual originator/initiator and the triangle EFG is determined as the real/actual location of the vehicle.

Next, the nearby vehicle driving speed estimation unit 500 estimates the driving speed by using the travel distance and the travel time of the vehicle measured during a predetermined period of time and estimates the driving direction of the nearby vehicle based on the direction from the base vertex, in this example, F to the top vertex, in this example, E being at the right angle, the base vertex F and the top vertex E being positioned on the left hand side of the left angled triangle (S106).

Figure 5:
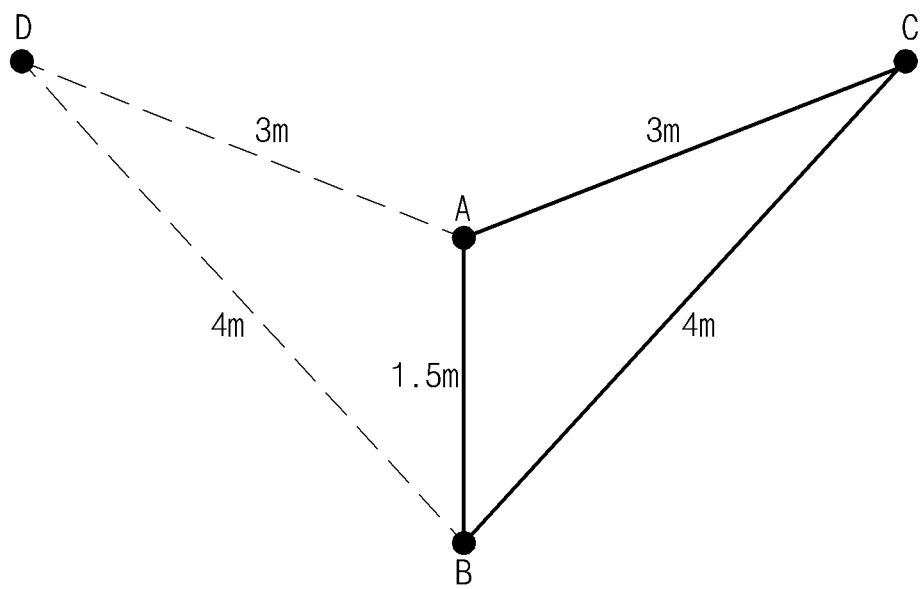
FIG. 5 is a view for explaining a method of calculating a distance to a nearby vehicle in FIG. 4.

In exemplary embodiments of FIGS. 5 and 6, the driving direction, the location, and the driving speed of the nearby vehicle are estimated with respect to one vehicle in the vicinity of the subject/first vehicle. However, it should be noted that the present invention can be applied to estimate the driving direction, the location, and the driving speed of multiple nearby vehicles in the vicinity of the subject/first vehicle. Also, as shown in FIG. 11, the estimated driving direction of respective nearby vehicles can be displayed on a screen of the display unit 700 to be viewed by the driver.

Thus, by using the above technique to detect one or more nearby vehicles according to the signal strength of the wireless signal transmitted and received according to the present invention, efficiency in detecting the nearby vehicle can be improved even when an obstacle 800 exists between a subject vehicle 810 and a nearby vehicle 820 because transmission and receipt of the wireless signal is available.

Figure 8:
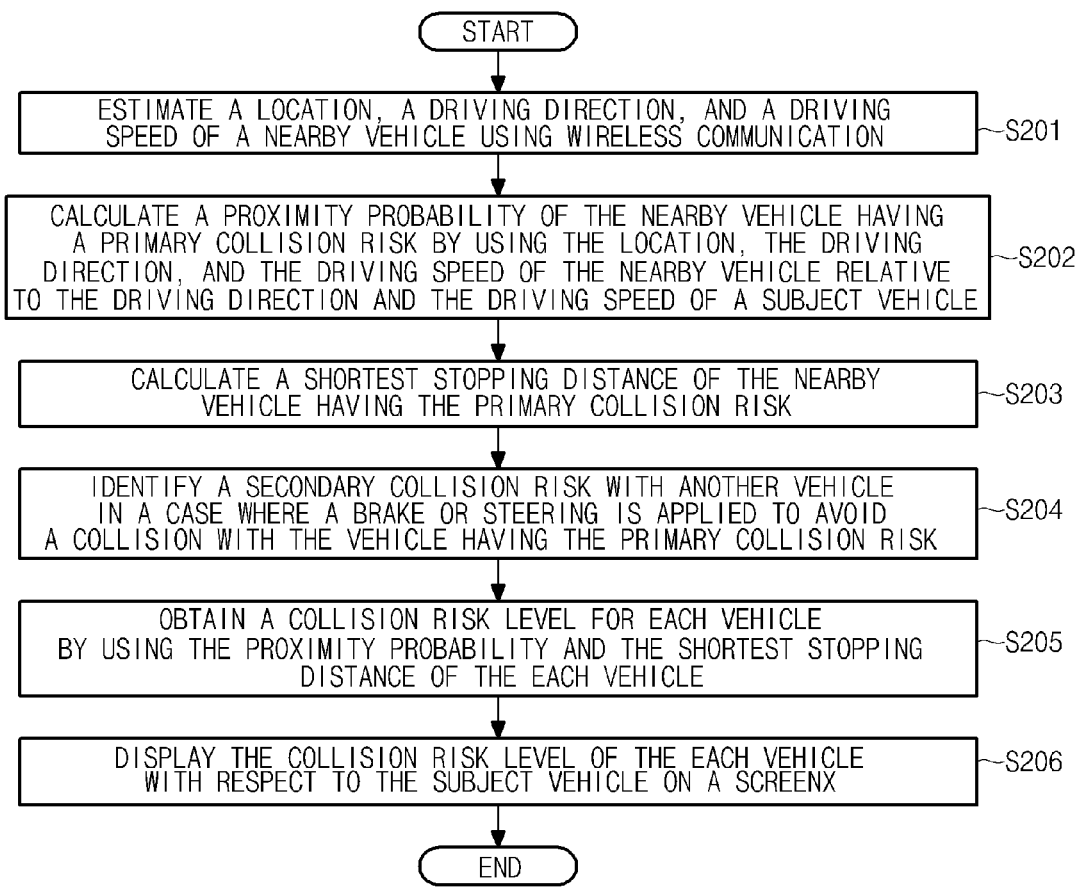
FIG. 8 is a flowchart illustrating a method of anticipating a collision with a nearby vehicle through detecting whether one or more vehicles are within an area surrounding a first vehicle is conducted via wireless communication according to an exemplary embodiment of the present invention.

Hereinafter, with reference to FIG. 8, a method of anticipating a collision with one or more nearby vehicles upon detecting one or more nearby vehicles using wireless communication according to an exemplary embodiment of the present invention is described.

Figure 4:
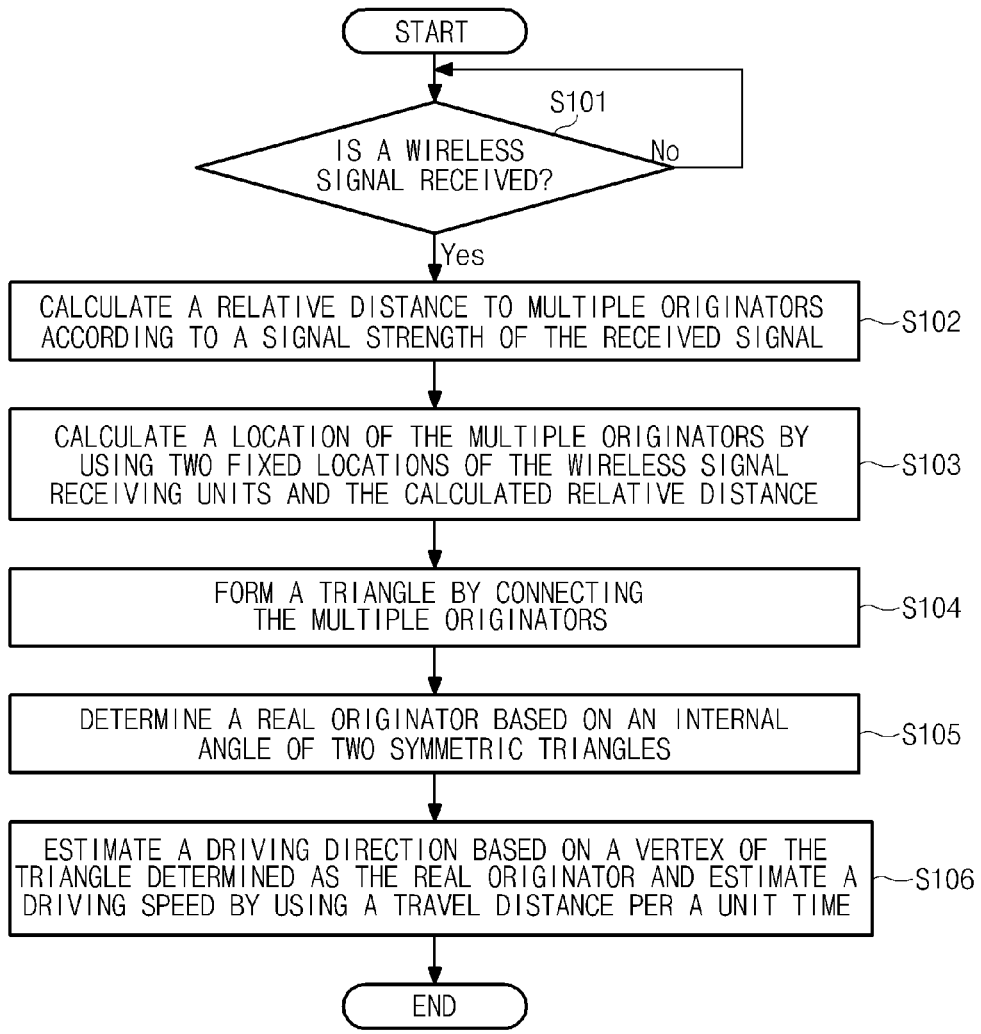
FIG. 4 is a flowchart illustrating a method of detecting whether one or more vehicles are within an area surrounding a first vehicle is conducted via wireless communication according to an exemplary embodiment of the present invention.
Figure 9:
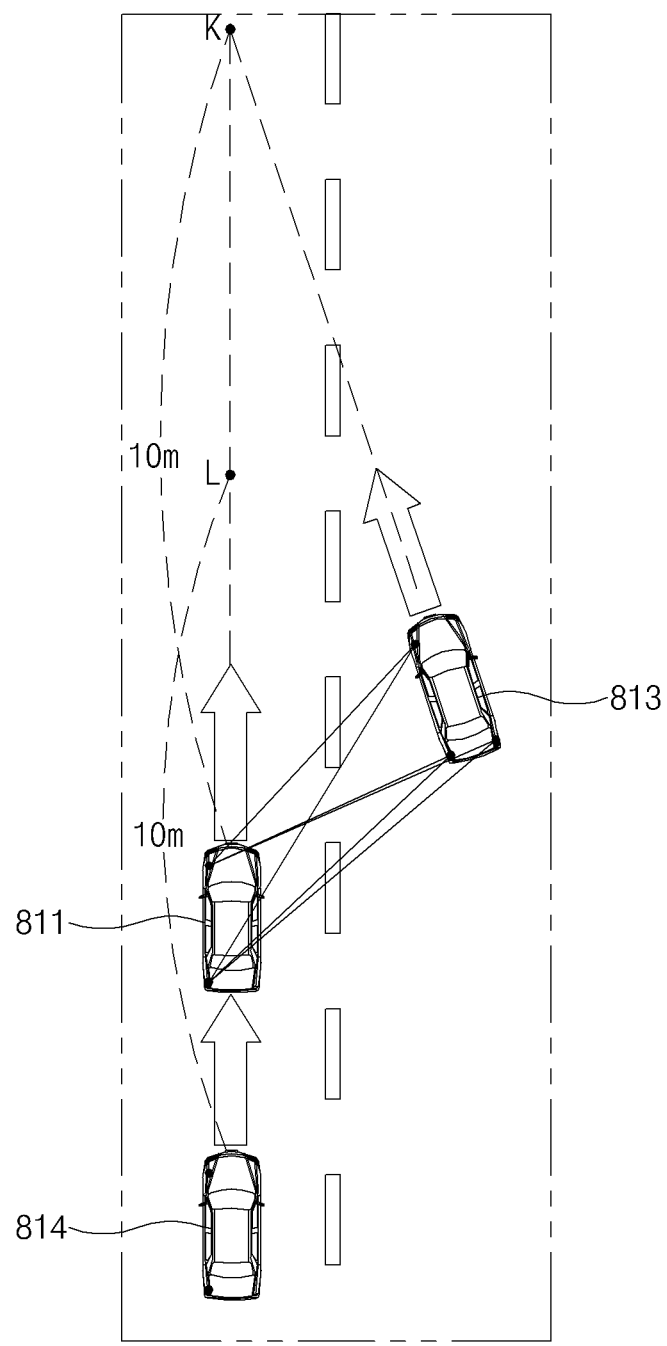
FIG. 9 is a view for explaining a method of anticipating a collision with a nearby vehicle via a wireless communication according to an exemplary embodiment of the present invention.

First, a nearby vehicle detection system using wireless communication estimates the location, the driving direction, and the driving speed of the nearby vehicles by using the wireless communication as shown in FIG. 4 (S201), and the collision risk level calculation unit 900 determines the proximity probability of the nearby vehicle having a primary collision risk in consideration of the location, the driving direction, and the driving speed of the nearby vehicle relative to the driving direction and the driving speed of the subject vehicle (S202). Namely, as shown in FIG. 9, a time point when the subject/first vehicle 811 will collide with the nearby vehicle 813 having the primary collision risk with the subject vehicle 811 is calculated based on the driving direction and the driving speed of the nearby vehicle 813 having the primary collision risk with the subject vehicle 811 so that it is possible to anticipate that the nearby vehicle will be within, e.g., about 1 m from the subject vehicle at a point K that is, e.g., about 10 m away.

Next, the collision risk level calculation unit 900 calculates the shortest stopping distance of the nearby vehicle having the proximity probability (S203). In other words, when the subject vehicle 811 and the nearby vehicle 813 are in proximity within, for example, about 1 m at the point K, the collision risk level calculation unit 900 determines a distance from the subject vehicle 811 to the point K as the shortest stopping distance, e.g., about 10 m.

Additionally, the collision risk level calculation unit 900 may also determine a secondary collision risk of another vehicle in case the subject vehicle 811 applies a brake or steering to avoid a collision with the nearby vehicle 813 having the primary collision risk (S204). Referring to FIG. 9, when the subject vehicle 811 applies the brake in order to avoid the collision with the nearby vehicle 813 having the primary collision risk, the secondary collision risk is created in another vehicle 814 following behind the subject vehicle 811 and the collision risk level calculation unit 900 calculates the proximity probability and the shortest stopping distance of the nearby vehicle 814 having the secondary collision risk. Namely, if the nearby vehicle 814 having the secondary collision risk travels to a point L at which the subject vehicle 811 is caused to stop by a brake application, the proximity probability is determined as within, e.g., about 1 m and the shortest stopping distance is, e.g., about 10 m.

Accordingly, the collision risk level calculation unit 900 obtains the collision risk level by using the proximity probability and the shortest stopping distance of each nearby vehicle (S205). Namely, the collision risk level calculation unit 900 determines the primary collision risk as being higher than the secondary collision risk, and when determining the primary collision risk, if the proximity probability is within, e.g., about 1 m and the shortest stopping distance is shorter, the primary collision risk is determined as being higher, and when determining the secondary collision risk, if the proximity probability is within, e.g., about 1 m and the shortest stopping distance is shorter, the secondary collision risk is determined as being higher. Thus, the collision risk can be relatively estimated for the each nearby vehicle respectively.

For example, the danger level of the nearby vehicle 813 having the primary collision risk can be determined in the above example as about 70% and the danger level of the nearby vehicle 814 having the secondary collision risk can be determined as about 50%. Next, as shown in FIG. 10, the collision risk level calculation unit 900 displays the nearby vehicle relative to the subject vehicle 811 on a screen along with the driving direction and the risk level of the nearby vehicle (S206). Here, the driving speed can be represented by a length of an arrow indicating the driving direction. For example, if the length of the arrow is longer, the driving speed is higher, and if the length of the arrow is shorter, the driving speed is lower.

In addition, the risk level of the nearby vehicle can be indicated by a color of the arrow. For example, a red color of the arrow may indicate the risk level equal to or greater than 90%, an orange color the risk level equal to or greater than 50% and less than 90%, and a green color the risk level less than 50%. It should be noted, however, that more additional colors an/or combinations can be used to indicate additional risk levels. Here, alternatively, a width of the arrow can be used to indicate the risk level or the driving speed. Also, the risk level can be represented by numbers.

According to the present invention, a nearby vehicle in a blind spot or located behind an obstacle can be detected by using a wireless communication technique to anticipate a collision with the nearby vehicle, thereby preventing an automobile accident.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:
1. A system for detecting whether one more vehicles are in the vicinity of a first vehicle using wireless communication, the system comprising:
   a plurality of wireless signal transmitting units configured to generate a wireless signal;

a plurality of wireless signal receiving units configured to receive the wireless signal generated within a nearby vehicle;

a nearby vehicle distance calculation unit configured to calculate a distance to the nearby vehicle according to a strength of a received wireless signal from the nearby vehicle;

a nearby vehicle location estimation unit configured to estimate a location of the nearby vehicle by using a distance between the plurality of the wireless signal receiving units and the calculated distance to the nearby vehicle;

a nearby vehicle driving speed estimation unit configured to estimate a driving speed of the nearby vehicle based on a travel distance per a unit of time of the nearby vehicle by using the location of the nearby vehicle; and a nearby vehicle driving direction estimation unit configured to estimate a driving direction of the nearby vehicle by using the location of the nearby vehicle.

2. The system according to claim 1, wherein the nearby vehicle location estimation unit determines a point where lines are drawn from two the wireless signal receiving units respectively and the lines meet as a location of the wireless signal transmitting unit of the nearby vehicle by using the distance between the plurality of the wireless signal receiving units and the calculated distance to the nearby vehicle.

3. The system according to claim 2, wherein the nearby vehicle location estimation unit is configured to connect the respective wireless signal transmitting units to form a triangle and determine a actual originator of the wireless signal based on a shape of the triangle formed.

4. The system according to claim 1, wherein the nearby vehicle driving direction estimation unit is configured to estimate the driving direction of the nearby vehicle based on a location of one of the plurality of the wireless signal transmitting units.

5. The system according to claim 1, wherein the nearby vehicle driving speed estimation unit is configured to estimate the driving speed of the nearby vehicle based on the travel distance per the unit time of the nearby vehicle by using the location of the nearby vehicle.

6. The system according to claim 1, further comprising a display unit configured to display a subject vehicle and the nearby vehicle on a screen, wherein the driving direction of the nearby vehicle is displayed.

7. The system according to claim 1, wherein the plurality of wireless signal transmitting units are configured to form a right angled triangle by connecting the plurality of wireless transmitting units therebetween.

8. The system according to claim 1, wherein the plurality of wireless signal receiving units and the plurality of wireless signal transmitting units are configured to form a triangle by connecting the plurality of wireless signal receiving units and the plurality of wireless signal transmitting units.

9. The system according to claim 1, further comprising:
a collision risk level calculation unit configured to calculate a collision risk level of the nearby vehicle by using the location of the nearby vehicle, the driving direction of the nearby vehicle, and the driving speed of the nearby vehicle.

10. The system according to claim 9, wherein the collision risk level calculation unit is configured calculate the collision risk level of the nearby vehicle by using a first proximity probability and a first shortest stopping distance of a first nearby vehicle having a primary collision risk and calculate a relative collision risk level of a second nearby vehicle having a secondary collision risk with respect to the first nearby vehicle having the primary collision risk by using a second proximity probability and a second shortest stopping distance of the second nearby vehicle.

11. A method of detecting whether one more vehicles are in the vicinity of a first vehicle, the method comprising:
calculating a distance to an originating point of a wireless signal according to a strength of the wireless signal when the wireless signal is received from a nearby vehicle;
estimating a location of the nearby vehicle by calculating a location of the originating point based on a distance to the originating point and a distance between wireless signal receiving units; and
estimating a driving speed and a driving direction of the nearby vehicle based on the location of the nearby vehicle.

12. The method according to claim 11, wherein, when the originating point includes multiple originating points, estimating a location of the nearby vehicle comprises:
connecting the multiple originating points to form a triangle and determining an actual originating point based on a shape of the triangle formed to estimate a location of the actual originating point with respect to a subject vehicle.

13. The method according to claim 12, wherein estimating a driving speed and a driving direction comprises:
estimating the driving direction of the nearby vehicle based on a location of one of the multiple originating points of the wireless signal.

14. The method according to claim 11, wherein estimating a driving speed and a driving direction comprises:
estimating the driving speed of the nearby vehicle based on a travel distance per a unit time of the nearby vehicle by using the location of the nearby vehicle.

15. The method according to claim 11, further comprising:
calculating a proximity probability and a shortest stopping distance of a first nearby vehicle having a primary collision risk by using the location of the first nearby vehicle, the driving direction of the first nearby vehicle, and the driving speed of the first nearby vehicle.

16. The method according to claim 15, further comprising:
calculating a second proximity probability and a second shortest stopping distance of a second nearby vehicle having a secondary collision risk in a case where a brake or steering is applied to avoid the primary collision risk.

17. The method according to claim 15, further comprising:
calculating a collision risk level by using a first proximity probability and a first shortest stopping distance of the first nearby vehicle having the primary collision risk; and
calculating a relative collision risk level of a second nearby vehicle having a secondary collision risk with respect to the first nearby vehicle having the primary collision risk by using a second proximity probability and a second shortest stopping distance of the second nearby vehicle.

18. The method according to claim 15, further comprising:
displaying a collision risk level, the driving direction and the driving speed of each nearby vehicle on a screen.

19. The method according to claim 18, wherein the collision risk level, the driving direction, and the driving speed of the nearby vehicle are represented by a length, a an arrow displayed to a driver.

20. A system for detecting whether one more vehicles are in the vicinity of a first vehicle using wireless communication, the system comprising:
a plurality transmitters configured to generate a wireless signal;

a plurality receivers configured to receive the wireless signal generated by one or more of the transmitters within a nearby vehicle;

a first unit configured to calculate a distance to the nearby vehicle according to a strength of a received wireless signal from the nearby vehicle;

a second unit configured to estimate a location of the nearby vehicle by using a distance between the plurality receivers and the calculated distance to the nearby vehicle;

a third unit configured to estimate a driving speed of the nearby vehicle based on a travel distance per a unit of time of the nearby vehicle by using the location of the nearby vehicle; and a fourth unit configured to estimate a driving direction of the nearby vehicle by using the location of the nearby vehicle.

* * * * *